United States Patent
Kleegrewe

(10) Patent No.: US 8,317,154 B2
(45) Date of Patent: Nov. 27, 2012

(54) METHOD FOR OPERATION OF A POSITION REGULATOR

(75) Inventor: Thomas Kleegrewe, Minden (DE)

(73) Assignee: ABB AG, Mannheim (DE)

( * ) Notice: Subject to any disclaimer, the term of this patent is extended or adjusted under 35 U.S.C. 154(b) by 999 days.

(21) Appl. No.: 12/326,427

(22) Filed: Dec. 2, 2008

(65) Prior Publication Data

US 2009/0146088 A1  Jun. 11, 2009

(30) Foreign Application Priority Data

Dec. 5, 2007  (DE) .................. 10 2007 058 518

(51) Int. Cl.
*F16K 31/12* (2006.01)
(52) U.S. Cl. .......................................... 251/29; 137/83
(58) Field of Classification Search ............. 251/129.04, 251/30.01, 29, 28; 137/553, 554, 83
See application file for complete search history.

(56) References Cited

U.S. PATENT DOCUMENTS

| | | | | |
|---|---|---|---|---|
| 3,922,955 A | * | 12/1975 | Kast .................................. | 91/461 |
| 4,492,246 A | * | 1/1985 | Prescott et al. ................... | 137/85 |
| 4,898,200 A | * | 2/1990 | Odajima et al. .................. | 137/85 |
| 5,207,737 A | * | 5/1993 | Hanley et al. .................... | 137/85 |
| 5,217,199 A | * | 6/1993 | Frey .................................. | 251/29 |
| 5,586,575 A | * | 12/1996 | Bergamini et al. ............ | 137/488 |
| 5,651,385 A | * | 7/1997 | Karte ................................ | 137/83 |
| 5,950,668 A | * | 9/1999 | Baumann ..................... | 137/487.5 |
| 6,453,261 B2 | * | 9/2002 | Boger et al. .................... | 702/138 |
| 6,584,999 B2 | * | 7/2003 | Inayama et al. ............ | 137/487.5 |
| 6,685,159 B1 | * | 2/2004 | Schnell ............................ | 251/59 |
| 6,705,347 B2 | * | 3/2004 | Itzhaky ..................... | 137/625.65 |
| 6,776,180 B1 | * | 8/2004 | Yonnet .............................. | 137/14 |
| 7,650,905 B2 | * | 1/2010 | Kubota et al. ................. | 137/554 |
| 2007/0045579 A1 | * | 3/2007 | Wirtl et al. ................ | 251/129.04 |
| 2010/0155632 A1 | * | 6/2010 | Minervini et al. .............. | 251/29 |

\* cited by examiner

*Primary Examiner* — John Rivell
*Assistant Examiner* — R. K. Arundale
(74) *Attorney, Agent, or Firm* — Buchanan Ingersoll & Rooney PC

(57) ABSTRACT

The disclosure relates to a method for operation of a position regulator for control of a pneumatic drive for an actuating member in a process installation. The position regulator has a pneumatic system with at least one nozzle/bounce-plate system, in which the bounce plates are in the form of piezo bending bars. For damped ventilation and venting of the pneumatic drive in the event of failure of the electrical power, it is proposed that the level of the electrical power supply be monitored and that, if a predeterminable limit value is undershot, the piezo bending bars of the pneumatics are adjusted via the input signals of the pneumatics such that the pneumatically controlled valves, which are subject to a characteristic, of the amplifier are open precisely just so far that a damped movement of the pneumatic actuating drive takes place to a predeterminable limit position at the desired movement speed.

3 Claims, 3 Drawing Sheets

METHOD FOR OPERATION OF A POSITION REGULATOR

RELATED APPLICATION

This application claims priority under 35 U.S.C. §119 to German Patent Application No. DE 10 2007 058 518.9 filed in Germany on Dec. 5, 2007, the entire content of which is hereby incorporated by reference in its entirety.

TECHNICAL FIELD

A method for operation of a position regulator for control of a pneumatic drive for an actuating member in a process installation is disclosed. In particular, the disclosure relates to the behavior of digital pneumatic position regulators in the event of sudden failure of the electrical power.

BACKGROUND INFORMATION

The expression "digital pneumatic position regulator" used in this disclosure represents a mechatronic system which moves a pneumatic drive to a specific position corresponding to one or more input signals. A regulator is not necessarily used for this purpose. In order to operate, the digital pneumatic position regulator requires pressurized gas as auxiliary energy and electrical energy.

The digital pneumatic position regulator which forms this genus has at least the core components that are described in more detail in the following text. A pneumatic system is used to deliberately ventilate or vent the chambers of a single-acting or double-acting pneumatic drive as a function of one or more input signals. The movements and positions of the actuating member are represented as one or more signals with the aid of a position feedback sensor system. Furthermore, control electronics are provided, which have a microcontroller and receive one or more input signals. The firmware in the control electronics processes the input signals and the signals from the position feedback sensor system to form output signals which are used as input signals for the pneumatic system.

The pneumatic system of the digital position regulator essentially comprises a control stage and an amplifier stage. The control stage comprises one or more nozzle/bounce-plate systems. Each nozzle/bounce-plate system converts an electrical—digital, discrete or analog—input signal to a position of the bounce plate with respect to the nozzle, and thus produces an output pressure which is proportional to the position. The amplifier stage uses the output pressures of the nozzle/bounce-plate systems as a control pressure, in order to move and position one or more pneumatically controlled valves, which is or are subject to a characteristic, on its or their valve characteristic. The pneumatically controlled valves which are subject to a characteristic are closed, or are open by an amount which is proportional to the control pressure, as a function of the control pressure. The pneumatically controlled valves which are subject to a characteristic ventilate or vent the chambers of a pneumatic drive.

For single-acting and double-acting pneumatic drives, the amplifier stage has a different number of pneumatically controlled valves, which are subject to a characteristic, by means of which the position regulator deliberately ventilates or vents the connected pneumatic drive. FIG. 1 shows the principle of double-acting pneumatics for a position regulator.

If the nozzle/bounce-plate systems do not receive any input signal, or receive an invalid input signal, the pneumatic system is set to a defined behavior. In this case, a distinction is drawn between a blocking behavior and a venting behavior. In the case of a blocking behavior, all of the pneumatically controlled valves which are subject to a characteristic of the amplifier stage are closed, as a result of which the pneumatic drive is neither ventilated nor vented. In the case of a venting behavior, a distinction is drawn between single-acting and double-acting pneumatic drives. In the case of single-acting pneumatic drives, the pneumatically controlled valves which are subject to a characteristic are controlled such that the chamber of the pneumatic drive is vented. In contrast, in the case of double-acting pneumatic drives, the pneumatically controlled valves which are subject to a characteristic are controlled such that one chamber of the pneumatic drive is vented and the second chamber of the pneumatic drive is ventilated.

The firmware of the digital pneumatic position regulator implements a function which analyzes the characteristics of the connected fitting and in the process "learns" what effect different input signals to the pneumatics have on the dynamics, such as fast or slow movement, of the fitting. Furthermore, this firmware function continuously or cyclically analyzes the extent to which the characteristics of the connected fittings change and in the process adapts the relationship between the input signals to the pneumatics and the resultant dynamics.

Nozzle/bounce-plate systems are known in which the bounce plates are in the form of piezo bending bars. A piezo-immanent characteristic is to maintain the charge even in the event of failure of the power supply. For a piezo bending bar, this means that the charge which produces the bending force is maintained, and that the piezo bending bar is thus locked in a defined shape, specifically that which corresponds to the most recently applied energy.

Furthermore, digital pneumatic position regulators implement a number of special functions in their software/firmware. One of these special functions is the so-called set-value ramp. In this function, a change in the input signals which recalls a sudden change in the set position of the pneumatic drive is converted internally within the position regulator software to a ramp. This function is used whenever excessively fast closing or opening of the actuating member which is regulated by the position regulator would have a negative influence on the process or installation. One example of these negative influences is water-hammering, whose effect may even lead to mechanical failure.

One problem of the known digital pneumatic position regulator is that the characteristics which are implemented in the software are lost as soon as the electrical power supply to the position regulator, and therefore both its microcontroller and the input signals for the pneumatics, fail. In the case of a position regulator which vents in the event of failure of the electrical power supply, this results in the pneumatic drive moving in an uncontrolled manner and therefore inevitably in the negative influences which are avoided by the set-value ramp as described above.

SUMMARY

Exemplary embodiments disclosed herein can develop the known digital pneumatic position regulator such that this nevertheless results in damped ventilation and venting of the pneumatic drive in the event of failure of the electrical power supply.

A method for operation of a position regulator for control of a pneumatic actuating drive for an actuating member is disclosed, having a pneumatic system with at least one nozzle/bounce-plate system, in which the bounce plates are in the form of piezo bending bars, wherein the level of the electrical power supply is monitored and, if a predeterminable limit value is undershot, the piezo bending bars of the pneumatics are adjusted via the input signals of the pneumatics such that the pneumatically controlled valves, which are subject to a characteristic, of the amplifier are open precisely just so far that a damped movement of the pneumatic actuating drive takes place to a predeterminable limit position at the desired movement speed.

In another aspect, a system is disclosed for operating an actuating member in a process installation. Such system comprises a position regulator having a system of pneumatics with at least one nozzle/bounce-plate system, in which bounce plates are in the form of piezo bending bars; pneumatically controlled valves capable of valve control; a pneumatic actuating drive capable of damped movement; and an electric power supply, a level of the electric power supply being monitored, wherein when a predetermined limit value pertaining to the level of the electrical power supply being monitored is undershot, the piezo bending bars of the pneumatics are adjusted via input signals such that the pneumatically controlled valves, which are subject to an amplifier characteristic, are open precisely such that a damped movement of the pneumatic actuating drive takes place to a predetermined limit position at a desired movement speed.

BRIEF DESCRIPTION OF THE DRAWINGS

The disclosure will be explained in more detail in the following text with reference to one exemplary embodiment. In the drawings which are required for this purpose.

DETAILED DESCRIPTION

Against the background of the known digital pneumatic position regulator, the level of the electrical power supply is first of all monitored. If a predeterminable limit value is undershot, the piezo bending bars of the pneumatics are adjusted via the input signals of the pneumatics such that the pneumatically controlled valves, which are subject to a characteristic, of the amplifier are open precisely just so far that a damped movement of the pneumatic drive takes place at the desired movement speed. This results in the actuating member having a movement/time behavior which is equivalent to a ramp function.

The input signals of the pneumatics that are required for this purpose have already been determined within the firmware function which analyzes the characteristics of the connected fitting.

In this case, the disclosure makes use of the capacitive characteristic of the piezo bending bar of maintaining its shape even without a power supply, for as long as the energy which maintains the shape is not deliberately dissipated.

Figure 1:
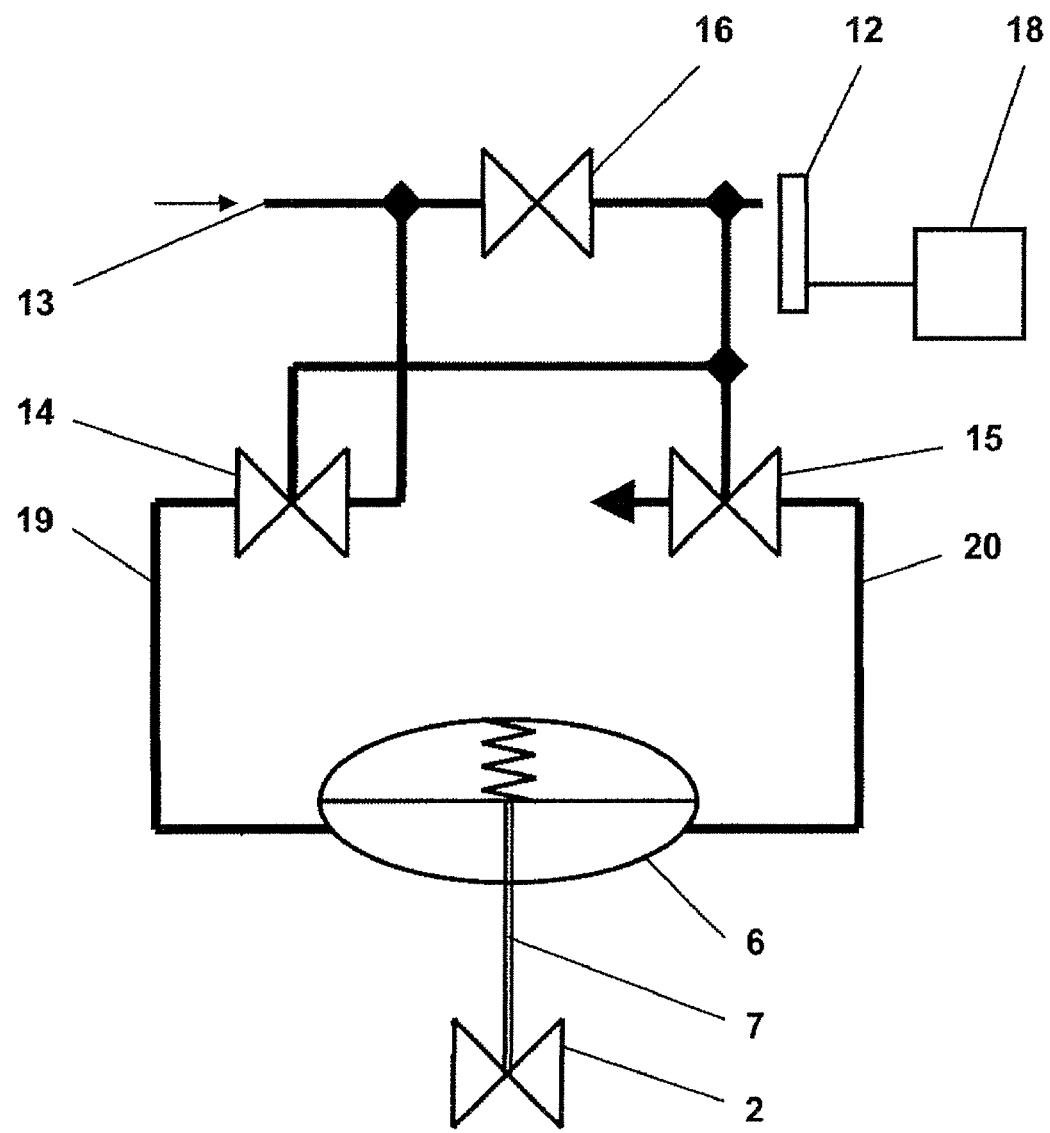
FIG. 1 shows an outline illustration of the pneumatic system of a position regulator.

FIG. 1 shows an outline illustration of the pneumatic system of a position regulator for a single-acting actuating drive 6. In the case of a single-acting actuating drive 6 such as this, the single pressure chamber is bounded by a spring-loaded membrane. When the pressure in the pressure chamber rises, the membrane is deflected in the direction of the compression spring; when the pressure in the pressure chamber decreases, the membrane is deflected by the force of the compression spring in the direction of the pressure chamber. A linear-movement rod 7 is attached to the membrane, in order to operate a process valve 2 which follows the membrane movement.

On the basis of a pressure-medium feed 13, a first pneumatic amplifier 14 is provided for ventilation via a pressure-medium supply 19, and a second pneumatic amplifier 15 is provided for venting an actuating drive 6 via a pressure medium outlet 20. The pneumatic amplifiers 14 and 15 are pressure-operated by a control pressure $p_s$. This means the flow F through the pneumatic amplifiers 14 and 15 is a function of the control pressure $p_s$.

The control pressure $p_s$ is produced by a nozzle/bounce-plate system which is fed via a pressure reducer 18 from the pressure-medium feed 13, and whose bounce plate is in the form of a piezo bending bar 12. The piezo bending bar 12 is connected to control electronics 18. The control pressure $p_s$ is a function of the position of the piezo bending bar 12. The position of the piezo bending bar 12 is set by electrical control signals from the control electronics 18, as a function of the desired position of the process valve 2.

Figure 2:
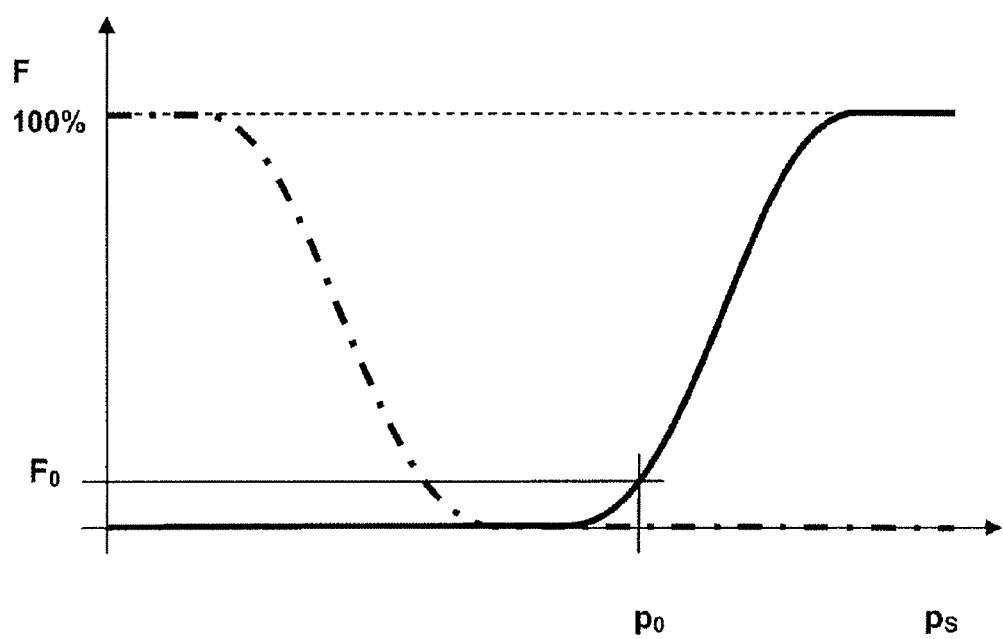
FIG. 2 shows a characteristic illustration.

The pneumatic amplifiers 14 and 15 have a configuration on the basis which the flow rate F through the pneumatic amplifiers 14 and 15 depends on the control pressure $p_s$. In this case, the pneumatic amplifiers 14 and 15 have mutually opposite and offset characteristics. In this context, FIG. 2 shows the profile of the flow rate F plotted against the control pressure $p_s$ for the first pneumatic amplifier 14 as a dash-dotted line, and for the second pneumatic amplifier 15 as a solid line.

When the control pressures $p_s$ are low, the first pneumatic amplifier 14 is switched on and the second pneumatic amplifier 15 is closed. The actuating drive 6 is ventilated. As the control pressure $p_s$ rises, the flow rate F through the first pneumatic amplifier 14 decreases to zero until both pneumatic amplifiers 14 and 15 are closed. The undisturbed actuating drive 6 locks in the position that is assumed.

As the control pressure $p_s$ rises further, the second pneumatic amplifier 15 opens as the flow rate F increases, until it is completely open. The actuating drive 6 is vented.

The speed of the linear-movement rod 7 is in each case proportional to the flow rate F of the first or second pneumatic amplifier 14 or 15.

Figure 3:
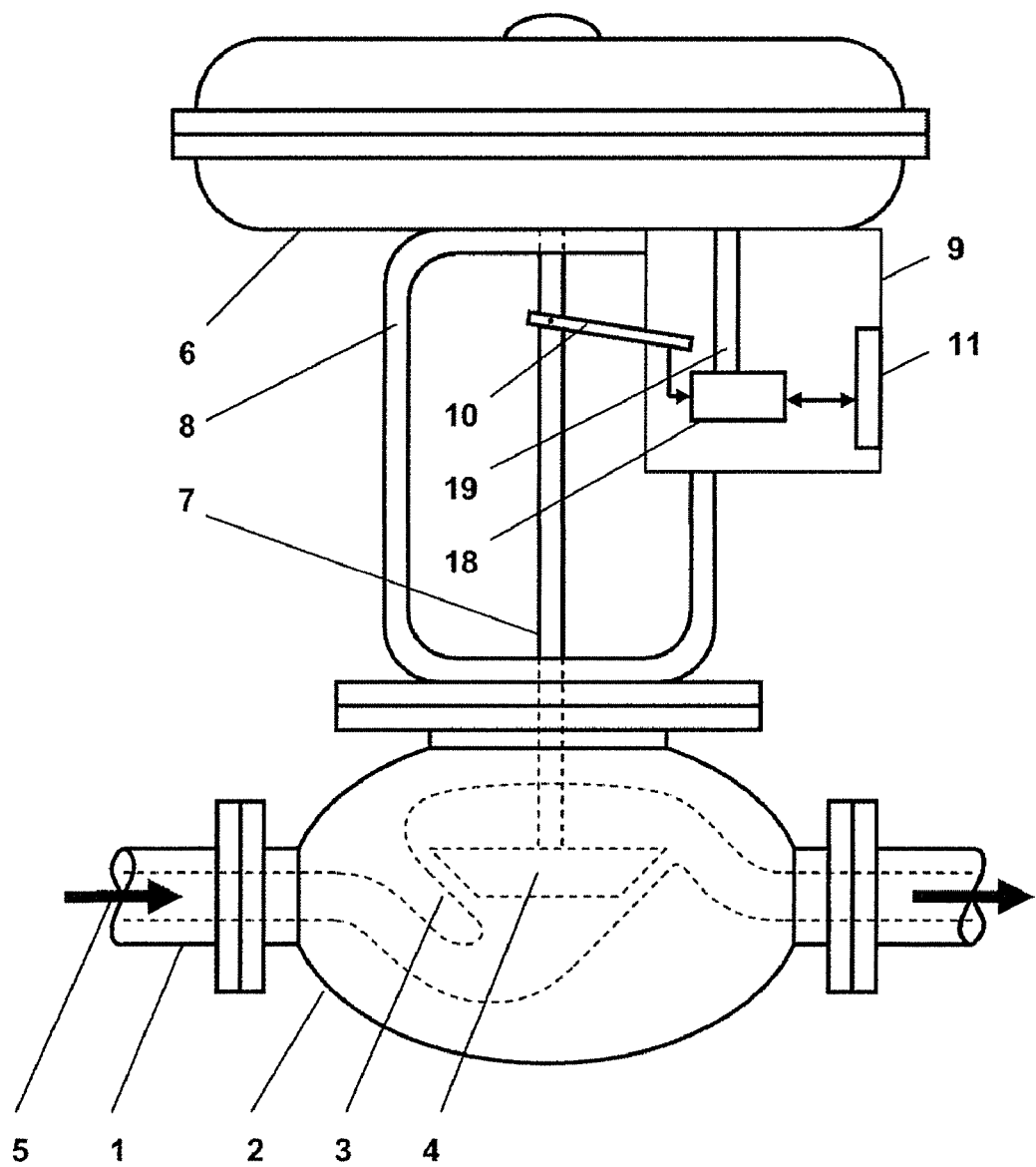
FIG. 3 shows an outline illustration of an actuating drive, which is operated by a pressure medium, with a digital position regulator.

FIG. 3 shows the use of the position regulator according to the disclosure in a practical application. A process valve 2 is installed as an actuating member in a pipeline 1 a fragment of which is indicated, of a process installation which is not illustrated in any more detail. In its interior, the process valve 2 has a closure body 4, which interacts with a valve seat 3, in order to control the amount of process medium 5 passing through. The closure body 4 is operated linearly via a linear-movement rod 7 by a pneumatic actuating drive 6. The actuating drive 6 is connected to the process valve 2 via a yoke 8. A digital position transmitter 9 is fitted to the yoke 8. The travel of the linear-movement rod 7 is signaled to the position transmitter 9 via a position sensor 10. The detected travel is compared in a control electronics 18 with the set value supplied via a communication interface 11, and the actuating drive 6 is operated as a function of the determined control error. The control electronics 18 of the position transmitter 9 operate an I/P converter for conversion of an electrical control error to an adequate control pressure. The I/P converter of the position transmitter 9 is connected to the actuating drive 6 via a pressure medium supply 19.

The characteristics of the connected process valve 2 are determined during the setting-up process. During this process, the characteristics, as shown in FIG. 2, of the first and of the second pneumatic amplifier 14 and 15 are also determined and recorded, as a function of the control signals for the piezo bending bars 12.

According to the disclosure, the level of the electrical power supply for the position regulator is monitored. If a predeterminable limit value is undershot, control signals are output, by means of the control electronics 18, to the piezo bending bars 12 in order to set a control pressure $p_0$ which corresponds to a flow rate $F_0$ of the second pneumatic amplifier 15. In consequence, the actuating drive 6 is vented with an initially constant outlet flow rate. In consequence, the connected process valve 2 moves at a controlled speed to the rest position, which is safe in the event of a fault.

In another exemplary embodiment of the disclosure, a control pressure $p_s$ can be set which corresponds to a flow rate F of the first pneumatic amplifier 14. In consequence, the actuating drive 6 is ventilated with an outlet flow rate which is initially constant. In consequence, the connected process valve 2 moves at a controlled speed to the opposite rest position, which is safe in the event of a fault.

In another exemplary embodiment of the disclosure, the position regulator is connected to a double-acting actuating drive 6. In the case of a double-acting actuating drive 6 such as this, the membrane is arranged between two pressure chambers which are ventilated and vented alternately. The position of the membrane represents a force equilibrium between the pressures in the pressure chambers and the reaction from the driven fitting. For this purpose, the position regulator has a bridge composed of four pneumatic amplifiers, two of which in each case have a ventilating effect while the other two have a venting effect, with the actuating drive 6 being arranged in the diagonal of this bridge, and with each pressure chamber being connected to a ventilating and a venting pneumatic amplifier.

If it is found that the monitored electrical power supply for the position regulator has undershot a predeterminable limit value, a control pressure $p_0$ which corresponds to a flow rate $F_0$ of the respective pneumatic amplifier is set such that the ventilating pneumatic amplifier is opened for one pressure chamber, and the venting pneumatic amplifier is opened for the opposite pressure chamber. This shifts the force equilibrium between the pressures in the two pressure chambers and the reaction from the driven fitting, and therefore the membrane, in the direction of the vented pressure chamber. The process valve 2 is accordingly moved via the linear-movement rod 7 at a controlled speed to the predetermined limit position.

Depending on the requirements of the specific application, the predetermined limit position may consist in the completely open or the completely closed state of the process valve 2.

It will be appreciated by those skilled in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description and all changes that come within the meaning and range and equivalence thereof are intended to be embraced therein.

List of Reference Symbols

1 Pipeline
2 Process valve
3 Valve seat
4 Closure body
5 Process medium
6 Actuating drive
7 Linear-movement rod
8 Yoke
9 Position transmitter
10 Position sensor
11 Communication interface
12 Piezo bending bar
13 Pressure-medium feed
14, 15 Pneumatic amplifiers
16 Pressure reducer
18 Control electronics
19 Pressure-medium supply
20 Pressure-medium outlet

What is claimed is:

1. A method for operation of a position regulator for control of a pneumatic actuating drive for an actuating member, having a system of pneumatics with at least one nozzle/bounce-plate system, in which the bounce plates are in the form of piezo bending bars,
wherein a level of an electrical power supply is monitored and, if a predeterminable limit value is undershot, the piezo bending bars of the pneumatics are adjusted via input signals of the pneumatics such that pneumatically controlled valves, which are subject to an amplifier control pressure characteristic, are opened precisely just so far that a damped movement of the pneumatic actuating drive takes place to a predeterminable limit position at a desired movement speed.

2. A system for operating an actuating member in a process installation, comprising:
a position regulator having a system of pneumatics with at least one nozzle/bounce-plate system, in which bounce plates are in the form of piezo bending bars;
pneumatically controlled valves capable of valve control;
a pneumatic actuating drive capable of damped movement; and
an electric power supply, a level of the electric power supply being monitored, wherein when a predetermined limit value pertaining to the level of the electrical power supply being monitored is undershot, the piezo bending bars of the pneumatics are adjusted via input signals such that the pneumatically controlled valves, which are subject to an amplifier control pressure characteristic, are opened precisely such that a damped movement of the pneumatic actuating drive takes place to a predetermined limit position at a desired movement speed.

3. The system according to claim 2, wherein the piezo bending bars are adjusted using a capacitive characteristic such that the pneumatically controlled valves are opened precisely such that damped ventilation and venting of the pneumatic drive are achieved in an event of failure of the electrical power supply.

* * * * *